United States Patent [19]

Chervenak et al.

[11] Patent Number: 5,043,019
[45] Date of Patent: Aug. 27, 1991

[54] SEALANT FOR CONCRETE OR CINDER BLOCK WALLS

[75] Inventors: Raymond R. Chervenak, Bristol, Va.; C. Dempsey Holstein, Princeton, W. Va.; Timothy J. Shean, Bristol, Tenn.

[73] Assignee: Sandvik Rock Tools, Inc., Bristol, Va.

[21] Appl. No.: 400,005

[22] Filed: Aug. 29, 1989

[51] Int. Cl.$^5$ .................... C04B 14/28; C04B 14/34; C04B 28/26

[52] U.S. Cl. .................... 106/612; 106/632; 106/634; 106/613; 106/617; 106/618

[58] Field of Search .................... 106/84, 78, 617, 618, 106/612, 613, 624, 632, 634

[56] References Cited

U.S. PATENT DOCUMENTS

| | | |
|---|---|---|
| 49,708 | 9/1865 | Brown . |
| 55,545 | 6/1866 | Ransome .................... 106/78 |
| 344,409 | 6/1886 | Schimmelpfeng .................... 106/624 |
| 346,336 | 7/1886 | Wendling . |
| 1,541,606 | 6/1925 | Wert . |
| 1,742,794 | 1/1930 | Storey et al. . |
| 2,162,387 | 7/1939 | Radabaugh .................... 106/624 |
| 2,407,615 | 9/1946 | Moon et al. .................... 106/618 |
| 2,695,850 | 11/1954 | Lorenz . |
| 3,782,984 | 1/1974 | Allemand et al. . |
| 4,066,463 | 1/1978 | Chollet .................... 106/618 |
| 4,105,457 | 8/1978 | Pietsch et al. .................... 106/78 |
| 4,132,555 | 1/1979 | Barrable .................... 106/90 |
| 4,263,365 | 4/1981 | Burgess et al. . |
| 4,363,666 | 12/1982 | Johnson et al. . |

FOREIGN PATENT DOCUMENTS

| | | |
|---|---|---|
| 2460543 | 7/1976 | Fed. Rep. of Germany . |
| 52-30528 | 4/1971 | Japan . |
| 21228 | 2/1978 | Japan . |
| 53-212278 | 2/1978 | Japan . |
| 56-20555 | 1/1982 | Japan . |
| 59-227757 | 12/1984 | Japan . |
| 549442 | 4/1975 | U.S.S.R. . |
| 1389 | of 1857 | United Kingdom .................... 106/78 |
| 4722 | of 1880 | United Kingdom .................... 106/78 |
| 1537663 | 10/1979 | United Kingdom . |

OTHER PUBLICATIONS

Modern Plastics, Goldfein, Apr. 1965, p. 156.

*Primary Examiner*—William R. Dixon, Jr.
*Assistant Examiner*—C. Melissa Bonner
*Attorney, Agent, or Firm*—Burns, Doane, Swecker & Mathis

[57] ABSTRACT

A composition for use as a sealant or coating for concrete block walls is disclosed which includes water soluble silicate, water, fibers, clay and limestone, wherein the limestone accelerates the drying of the composition. The fibers used may be non-allergenic fibers such as polyethylene or polypropylene fibers. A method of using the sealant composition also is disclosed.

26 Claims, No Drawings

SEALANT FOR CONCRETE OR CINDER BLOCK WALLS

BACKGROUND OF THE INVENTION

Certain concrete and/or cinder block walls are made without mortar between the blocks. For example, concrete or cinder block walls in coal mines often are made without mortar. When no mortar is used, a coating over the surfaces of the wall may be used to add strength and integrity to the wall and/or reduce air flows through the wall.

Typically, such coatings are made of compositions containing water soluble silicates, water, clay, fiberglass and a modifier. These compositions dry very slowly, particularly when the coating is very thick. The surface normally drys forming a silicate skin which then retards the drying. Further drying produces a thicker skin which further slows the drying. Attempts to increase the drying speed of the coating have resulted in cracking of the coating, which causes the coating to be ineffective as a sealant. The coating is less effective when cracked because it then imparts less flexural strength to the concrete block wall and allows air flows through the wall.

A further problem with these coatings is that the fiberglass in the coating material is an irritant to skin and eyes which causes the coating material to be difficult to handle.

There is a need in the art for a sealant composition which can impart strength to a concrete or cinder block wall, dry relatively quickly and is not irritating to handle.

SUMMARY OF THE INVENTION

The present invention relates to a sealant for coating concrete or cinder block walls which includes a water soluble silicate, water, fibers, clay and limestone. In one aspect, the invention is directed to a sealant composition for coating concrete or cinder block walls comprising, by weight, about 1.8 to about 20% water soluble silicate, about 3.6 to about 46% water, about 0.01 to about 0.3% fibers, up to about 48% clay and about 1 to about 93% limestone.

In another aspect, the invention is directed to a sealant composition for coating concrete or cinder block walls comprising, by weight, about 6 to about 18% water soluble silicate, about 12 to about 41% water, about 0.03 to about 0.20 fibers, up to about 48% clay and about 2 to about 73% limestone.

In a further aspect, the invention is directed to a sealant composition for coating concrete or cinder block walls comprising water soluble silicate, water, fibers, clay and limestone wherein the limestone is present in an amount effective for accelerating drying of said sealant composition.

In a further aspect, the invention is directed to a sealant composition for coating concrete or cinder block walls containing water soluble silicate, water, fibers and clay, the improvement comprising a sealant composition wherein the fibers are polyethylene fibers, polypropylene fibers or alloys, copolymers or mixtures thereof.

In a still further aspect, the invention is directed to a sealant composition for coating concrete or cinder block walls comprising water soluble silicate, water, clay and limestone wherein the limestone is present in an amount effective for accelerating drying of said sealant composition.

There also is provided a method of coating concrete or cinder block walls using the sealant compositions of the invention.

DETAILED DESCRIPTION OF THE PREFERRED EMBODIMENTS

The composition of the present invention is useful as a sealant coating for concrete or cinder block walls. The invention is particularly useful as a coating composition for walls made without mortar. The invention is even more particularly useful for concrete or cinder block walls made without mortar which are built in mines.

The sealant composition preferably is composed of, by weight, about 1.8 to about 20% water soluble silicate, about 3.6 to about 46% water, about 0.01 to about 0.3% fibers, up to about 48% clay and about 1 to about 93% limestone.

In the sealant composition of the invention, the water soluble silicate functions as a binder, giving strength to the product and helping to adhere the particles of the sealant composition. The water soluble silicate and at least a portion of the water are preferably present as an aqueous silicate solution. The aqueous silicate solution preferably contains about 30 to about 40% solids by weight of the total silicate solution. The water soluble silicates which may be used in the sealant composition include sodium silicate, potassium silicate, lithium silicate and quaternary ammonium silicates. The preferred water soluble silicate is sodium silicate. Use of sodium silicate results in an economical sealant composition since the cost is generally less than the other silicates.

In one embodiment of the invention, the sealant composition includes about 1.8 to about 20%, by weight, water soluble silicate. In a preferred embodiment, the water soluble silicate is present in an amount of from about 6 to about 18% by weight of the total amount of sealant composition.

The water in the sealant composition is a diluent which is used to adjust viscosity as well as lower the formula cost. The water may be added to the sealant composition separately or, where an aqueous silicate solution is used, the water in solution with the water soluble silicate may be the only water in the composition. In a preferred embodiment, a portion of the total water in the composition is in an aqueous silicate solution and a portion of the water is added separately. Water preferably is present in an amount of about 3.6 to about 46%. In a preferred embodiment, the sealant composition includes about 12 to about 41% water.

The fibers in the sealant composition serve as a reinforcing filler to add strength to the sealant composition. These fibers are preferably non-allergenic fibers, such as polypropylene fibers, polyethylene fibers, or copolymers, alloys or mixtures of polypropylene and polyethylene and/or other polyolefins, polytetrafluoroethylene, fluorinated ethylene-propylene polymers, polychlorofluoroethylene polymers, nylon, polyester, acrylic, copolymers of acrylonitrile (such as Orlon TM), regenerated cellulose (such as Fortisan TM), and the like. The more preferred fibers for the composition of the invention are polypropylene or polyethylene fibers. Polypropylene fiber is the most preferred for use in the sealant composition. The fibers useful in the sealant composition are commercially available. The fibers to be used generally will be between about 6 mm and about 30 mm. The fibers generally will be somewhat flexible and generally will be long enough to curl at least slightly. The curl allows the fibers to mesh with each other, providing strength. Longer fibers are known to provide greater strength, but a larger quantity of shorter fibers may be used to obtain strength, if preferred. The fibers generally are present in an amount of from about 0.01 to about 0.3%, by weight of the total composition. In a preferred embodiment, the fibers are present in an amount of from about 0.03 to about 0.20%.

These fibers generally do not cause skin irritation and provide an excellent bond to the water soluble silicate. It has been discovered that the degree of bonding between water soluble silicate and the fibers is greater than expected. This is an advantage of the sealant composition because this bonding increases the flexural strength of the concrete or cinder block wall coated with the sealant composition. A wall of concrete block made without mortar, or dry-stack concrete block wall, has low flexural strength. By using the sealant composition of the present invention on a dry-stack concrete block wall, the wall can be made quite rigid with good flexural strength. The flexural strength of a concrete block with mortar, according to the Mine Safety and Health Administration, Department of Labor, is 39 lb/ft$^2$. The flexural strength of a wall coated with the sealant of the present invention is generally greater than 39 lb/ft$^2$. As exemplified below in Example 2, the flexural strength of a wall made without mortar and coated with the sealant composition of the present invention may have 3 to 4 times the flexural strength of a wall made with mortar.

The clay in the sealant composition is used as a texture filler, which gives body and smoothness to the composition. Since smoothness may not be required for certain applications, the clay component of the composition may be omitted. In that event, the limestone content generally will be increased. Since clay absorbs more water than limestone, the amount of water will be adjusted according to the respective amounts of clay and limestone present in the composition. Clays useful for the composition of the invention are known in the art. The clays which may be used include any hydrated aluminum silicate such as bentonite, kaolin or ball clay. A preferred clay for use in the sealant composition is ball clay which can be obtained from Kentucky-Tennessee Clay Co. The clay is present in the sealant composition in an amount of up to about 48%, by weight of the total composition. In a preferred embodiment, there is at least some clay in the composition to provide smoothness to the composition. An especially preferred minimum amount of clay is about 5% by weight.

The limestone of the sealant composition is a product modifier which speeds up the drying rate. While not wishing to be bound by any theory, it is believed that the drying process is accelerated because the limestone particles form a non-hygroscopic matrix within the hygroscopic clay/water/silicate system. This provides a porous pathway for the release of water in the sealant composition to the surface of the coating. The porous matrix of the limestone in the sealant thus allows the water in the sealant to move out of the coating more rapidly than in compositions not containing limestone. The drying is accelerated by use of the limestone but cracking is not induced as with other methods of drying acceleration. The amount of acceleration of drying will depend on the temperatures and humidities of the atmosphere in the area of the concrete block being coated with the sealant composition. However, the use of the limestone generally will decrease the time needed for drying by about 25 to about 60%. The limestone used in the composition may be any commercially available limestone. Preferred types of limestone include dolomite or calcite. The most preferred limestone for the composition of the invention is dolomite. Generally, the limestone will be pulverized before it is added to the sealant composition. The limestone should be added to the sealant composition in an amount effective for accelerating the drying of the resultant sealant composition. In one embodiment, the limestone is included in the sealant composition in an amount of from about 1 to about 93% limestone. In a more preferred embodiment, the limestone is included in an amount of from about 2 to about 73%.

Other known filler materials may be used in the sealant composition such as talcs.

The sealant composition may be prepared by mixing the water soluble silicate, either in solution or not, with water and fiber and then adding half of the clay and mixing until the liquids come to the top. The remainder of the clay may then be added and the mixture stirred until the liquids come to the top again. The limestone then may be added to the mixture and the mixture stirred for 15 to 25 minutes. The resulting sealant composition may be packaged for marketing. The composition is stable and has a good shelf life. The composition may be stored from about six to about eight weeks.

A method for coating concrete or cinder block walls is provided which involves coating the walls with a sealant composition of the present invention. Concrete or cinder block walls may be coated by hand, using a glove or a trowel for application of the sealant composition. This method of coating walls is preferably used on concrete or cinder block walls made without mortar, especially such walls in mines.

The following examples are provided to further illustrate the invention, but are not meant to limit the scope of the invention in any way.

EXAMPLES

EXAMPLE 1

A sealant composition was prepared by first adding 52.5 pounds of a binder, an aqueous sodium silicate solution containing 37.4% solids and a weight ratio of $SiO_2:Na_2O$ of 3.2:1, to a Hobart mixer. Ten pounds of water was then added to the mixer. A polypropylene (Hercules Inc., 15 denier, 10 mm long) fiber- then was added to the mixer in an amount of 55 grams. The sodium silicate solution, water and fibers were mixed for six minutes. One half of the clay, or 28 pounds of ball clay, then was added. The solution was mixed until the liquids came to the top and then the remaining 28 pounds of clay was added. The liquids were thoroughly mixed until the liquids came to the top again. 4.5 pounds of dolomite limestone was blended into the solution for one minute. The total solution then was mixed for 18 minutes longer. The resulting sealant composition was packaged in five gallon pails.

EXAMPLE 2

Three 4'×8' wall panels were constructed of standard 8" concrete blocks. The blocks were laid on top of each other to construct a panel approximately 4' wide×8' high with a layer of the sealant composition of Example 1 coated on both sides of the panel. The thickness of application was 3/16" to ¼".

The panels were build on 10"×50" wood pallets with spaces on the bottom so the panels could be lifted for testing. The 4'×8' panels were placed against one side of the test frame and was supported by two pipes approximately 6" from each end of the 8' wall. The remainder of the apparatus, which would apply the testing force, was placed against the 4'×8' wall. The contact with the wall was by means of two pipes four feet apart and two feet from each end of the 4'×8' wall. Force was applied via these contacts by means of a hydraulic cylinder. The force was measured by a pressure gauge calibrated to read force.

Test Results

The load as indicated was taken from the pressure gauge on the ram and jack assembly used for the force test. The clear span of the panels was 48"×78 ¼". This was used to compute the load per square foot.

The testing was conducted in accordance with ASTM Designation E 72-80, Standard Methods of Conducting Strength Tests of Panels for Building Construction.

The following are the results.

| Panel I.D. | Max. Load | Area Sq.Ft. | Pounds/Ft² |
| --- | --- | --- | --- |
| #1 - 3/16"-¼" Coating Both Sides | 2850 | 26.1 | 109 |
| #2 - 3/16"-¼" Coating Both Sides | 4500 | 26.1 | 172 |
| #3 - 3/16"-¼" Coating Both Sides | 4320 | 26.1 | 265 |
|  |  | Average | 149 |

From the foregoing description, various modifications and changes in the composition and in the method of using such composition will occur to those skilled in the art. All such modifications or changes coming within the scope of the appended claims are intended to be included therein.

We claim:

1. A sealant composition for coating concrete or cinder block walls comprising, by weight, about 1.8 to about 20% water soluble silicate, about 3.6 to about 46% water, about 0.01 to about 0.3% fibers, up to about 48% clay and about 1 to about 73% limestone.

2. The sealant composition of claim 1 wherein the water soluble silicate is sodium silicate.

3. The sealant composition of claim 1 wherein the fibers are polyethylene fibers, polypropylene fibers, or alloys, copolymers or mixtures of polypropylene and polyethylene, polytetrafluoroethylene, fluorinated ethylene - propylene polymers, polychlorofluoroethylene polymers, nylon, polyester, acrylic, copolymers of acrylonitrile, or regenerated cellulose fibers.

4. The sealant composition of claim 3 wherein the fibers are polypropylene fibers.

5. The sealant composition of claim 1 wherein the limestone is present in an amount effective for accelerating drying of the sealant composition.

6. The sealant composition of claim 1 wherein the limestone is dolomite.

7. The sealant composition of claim 1 wherein the water soluble silicate and at least a portion of the water are present as an aqueous silicate solution which contains about 30 to about 40% solids.

8. A sealant composition for coating concrete or cinder block walls comprising, by weight, about 6 to about 18% water soluble silicate, about 12 to about 41% water, about 0.03 to about 0.20% fibers, up to about 48% clay and about 2 to about 73% limestone.

9. The sealant composition of claim 8 wherein the water soluble silicate is sodium silicate.

10. The sealant composition of claim 8 wherein the fibers are polyethylene fibers, polypropylene fibers, or alloys, copolymers or mixtures of polypropylene and polyethylene, polytetrafluoroethylene, fluorinated ethylene - propylene polymers, polychlorofluoroethylene polymers, nylon, polyester, acrylic, copolymers of acrylonitrile, or regenerated cellulose fibers.

11. The sealant composition of claim 10 wherein the fibers are polypropylene fibers.

12. The sealant composition of claim 9 wherein the limestone is present in an amount effective for accelerating drying of the sealant composition.

13. The sealant composition of claim 9 wherein the limestone is dolomite.

14. The sealant composition of claim 9 wherein the water soluble silicate and at least a portion of the water are present as an aqueous silicate solution which contains about 30 to about 40% solids.

15. A sealant composition for coating concrete or cinder block walls comprising water soluble silicate, water, fibers, clay and limestone wherein the limestone is present in an amount effective for accelerating drying of said sealant composition.

16. A sealant composition for coating concrete or cinder block walls consisting essentially of sodium silicate, water, fibers and clay, wherein the fibers comprise polyethylene fibers, polypropylene fibers, or alloys, copolymers or mixtures of polypropylene and polyethylene, polytetrafluoroethylene, fluorinated ethylene - propylene polymers, polychlorofluoroethylene polymers, nylon, polyester, acrylic, copolymers of acrylonitrile, or regenerated cellulose fibers.

17. In the sealant composition of claim 16 wherein the fibers are polypropylene fibers.

18. A sealant composition for coating concrete or cinder block walls consisting essentially of water soluble silicate, water, clay and limestone wherein the limestone is present in an amount effective for accelerating drying of said sealant composition.

19. A method for coating concrete or cinder block walls comprising coating said concrete or cinder block walls by applying a sealant composition comprising, by weight, about 1.8 to about 20% water soluble silicate, about 3.6 to about 46% water, about 0.01 to about 0.3% fibers, up to about 48% clay and about 1 to about 73% limestone.

20. The method of claim 18 wherein the water soluble silicate is sodium silicate.

21. The method of claim 19 wherein the fibers are polyethylene fibers polypropylene fibers, or alloys, copolymers or mixtures of polypropylene and polyethylene, polytetrafluoroethylene, fluorinated ethylene - propylene polymers, polychlorofluoroethylene polymers, nylon, polyester, acrylic, copolymers of acrylonitrile, or regenerated cellulose fibers.

22. The method of claim 19 wherein the concrete or cinder block walls coated are made without mortar.

23. The method of claim 22 wherein the concrete or cinder block walls are in a mine.

24. The method of claim 19 wherein the limestone is present in an amount effective for accelerating drying of said sealant composition.

25. The method of claim 19 wherein the limestone is dolomite.

26. The method of claim 19 wherein the water soluble silicate and at least a portion of the water present are present as an aqueous silicate solution which contains about 30 to about 40% solids.

* * * * *